(12) United States Patent
Bertrand et al.

(10) Patent No.: US 12,379,814 B1
(45) Date of Patent: Aug. 5, 2025

(54) CONTINUOUS OPENING IN A SHIELD LAYER

(71) Applicant: Cirque Corporation, Sandy, UT (US)

(72) Inventors: Jon Bertrand, Taylorsville, UT (US); Paul Glad, Sandy, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/793,152

(22) Filed: Aug. 2, 2024

(51) Int. Cl.
*G06F 3/044* (2006.01)

(52) U.S. Cl.
CPC .. *G06F 3/0446* (2019.05); *G06F 2203/04107* (2013.01); *G06F 2203/04111* (2013.01)

(58) Field of Classification Search
CPC ......... G06F 3/0446; G06F 2203/04107; G06F 2203/04111
See application file for complete search history.

(56) References Cited

U.S. PATENT DOCUMENTS

| | | | |
|---|---|---|---|
| 3,743,083 A | 7/1973 | James | |
| 5,856,822 A | 1/1999 | Du | |
| 6,188,391 B1 | 2/2001 | Seely | |
| 6,380,930 B1 | 4/2002 | Van Ruymbeke | |
| 8,633,916 B2 | 1/2014 | Bernstein | |
| 8,933,901 B2 | 1/2015 | Paulsen | |
| 8,988,628 B2 | 3/2015 | Martisauskas | |
| 9,178,267 B2 | 11/2015 | Yeh | |
| 9,223,352 B2 | 12/2015 | Smith | |
| 9,323,399 B2 | 4/2016 | Osoinach | |
| 9,350,078 B2 * | 5/2016 | Ando | H01Q 9/0407 |
| 10,438,425 B2 | 10/2019 | McLeod | |
| 10,606,323 B1 | 3/2020 | Chang | |
| 10,877,616 B2 | 12/2020 | Liu | |
| 10,924,856 B2 | 2/2021 | Liu | |
| 11,054,932 B2 * | 7/2021 | Xu | G06F 3/0416 |
| 11,281,340 B2 * | 3/2022 | Bertrand | H04B 5/70 |
| 11,620,027 B1 * | 4/2023 | Bertrand | G06F 3/0446 345/173 |
| 11,719,971 B1 * | 8/2023 | Bertrand | G02F 1/13338 345/173 |
| 11,983,373 B1 * | 5/2024 | Smith | G06F 3/0446 |
| 2011/0084920 A1 | 4/2011 | Glad | |
| 2011/0169770 A1 | 7/2011 | Mishina | |
| 2011/0273382 A1 | 11/2011 | Yoo | |
| 2012/0034888 A1 | 2/2012 | De Flaviis | |
| 2012/0133597 A1 | 5/2012 | Chen | |
| 2012/0146857 A1 | 6/2012 | Wang | |
| 2013/0162594 A1 | 6/2013 | Paulsen | |
| 2013/0285797 A1 | 10/2013 | Paulsen | |
| 2014/0111474 A1 | 4/2014 | Bytheway | |
| 2014/0145979 A1 | 5/2014 | Lee | |
| 2014/0253830 A1 | 9/2014 | Li | |
| 2014/0320352 A1 | 10/2014 | Hsu | |
| 2015/0084868 A1 | 3/2015 | Tenuta | |

(Continued)

*Primary Examiner* — Amy Onyekaba

(57) ABSTRACT

A capacitance module may include a capacitance electrode on a first substrate, shielding material disposed on a second substrate where the second substrate is aligned with the first substrate, an antenna where the shielding material is between the antenna and the capacitance electrode, and a continuous opening defined in the shielding material. The continuous opening may include a branching shape, the branching shape having a stem and multiple branches extending from the stem; and the continuous opening may overlap with the antenna.

18 Claims, 11 Drawing Sheets

(56) References Cited

U.S. PATENT DOCUMENTS

| | | |
|---|---|---|
| 2015/0268742 A1 | 9/2015 | Park |
| 2016/0103546 A1 | 4/2016 | Hemminki |
| 2016/0124574 A1 | 5/2016 | Rouaissia |
| 2016/0195955 A1 | 7/2016 | Picciotto |
| 2018/0032166 A1 | 2/2018 | Orihara |
| 2018/0046283 A1 | 2/2018 | Yoshida |
| 2018/0108710 A1 | 4/2018 | Lin |
| 2018/0261824 A1 | 9/2018 | Ju |
| 2019/0114000 A1 | 4/2019 | Chen |
| 2019/0148988 A1 | 5/2019 | Hwang |
| 2019/0152196 A1 | 5/2019 | Xu |
| 2019/0332210 A1 | 10/2019 | Lee |
| 2019/0363297 A1 | 11/2019 | Park |
| 2022/0011868 A1* | 1/2022 | Junus ..................... G06F 3/045 |
| 2022/0109229 A1 | 4/2022 | Kim |
| 2022/0155893 A1* | 5/2022 | Bertrand ............... G06F 3/0445 |
| 2022/0350430 A1* | 11/2022 | Bertrand ................ H01Q 1/421 |
| 2024/0012524 A1* | 1/2024 | Smith .................... G06F 3/0446 |
| 2024/0039150 A1* | 2/2024 | Taylor .................. H01Q 1/2266 |

* cited by examiner

CONTINUOUS OPENING IN A SHIELD LAYER

FIELD OF THE DISCLOSURE

This disclosure relates generally to systems and methods for capacitive touch/proximity sensors. In particular, this disclosure relates to systems and methods for enabling and optimizing wireless signal transmission through capacitive touch/proximity sensors.

BACKGROUND

Capacitive touch pads are frequently incorporated into electronic devices, such as laptop computers, to enable users to provide input and make selections using fingers or styli. In some cases, capacitive touch pads may include antennas operating on protocols like Wi-Fi, Bluetooth, near field communications (NFC), or other protocols. Some capacitive touch pads use electrical shielding to prevent interference from the device's internal noise.

An example of an antenna embedded within a touchpad is disclosed in U.S. Pat. No. 8,985,466 issued to Yen-Liang Wu, et al. A multi-function Radio-Frequency device integrated into a computer system is disclosed and includes a substrate including a first surface and a second surface opposite to each other, a touchpad area disposed on the first surface of the substrate for generating a touch signal according to a touch situation, an antenna disposed on the first surface and/or the second surface of the substrate for receiving and transmitting a Radio-Frequency signal, and a control module disposed on the second surface of the substrate and coupled to the touchpad area and the antenna for generating a touch control signal according to the touch signal and generating an identification signal according the to the Radio-Frequency signal to the computer system.

Another example is disclosed in U.S. Patent Publication No. 2020/0192542 issued to Wei-Hsiu Chang, et al. A method and a display device with an integrated antenna that are capable of efficiently utilizing internal space of the display device as well as avoiding interferences are introduced. The display device includes a display panel, the antenna being integrated in the inactive display area of the display panel, and a display driver. The display panel includes an active display area and an inactive display area. The display driver is coupled to the display panel and the antenna and is configured to control the antenna and the display panel in a time-sharing manner.

An example of an NFC antenna integrated into a touch screen is disclosed in U.S. Patent No. 2015/0062853 issued to Jianhua Li, et al. This reference discloses a touch screen having integrated an NFC antenna. The NFC antenna is arranged on the touch screen and is connected to a mainboard having a control chip. The NFC antenna is provided directly on the touch screen, thus combining a touch feature and the NFC feature into one. This prevents the problem of signal quality deterioration and reception failure due to wearing of the NFC antenna and inaccurate alignment, while at the same time, facilitates the antenna in receiving and transmitting signals, thus ensuring smooth communication.

Each of these references are herein incorporated by reference for all that they disclose.

SUMMARY

A capacitance module may include a capacitance electrode on a first substrate; shielding material disposed on a second substrate where the second substrate may be aligned with the first substrate; an antenna where the shielding material may be between the antenna and the capacitance electrode; and a continuous opening may be defined in the shielding material. The continuous opening may include a branching shape where the branching shape may include a stem and multiple branches extending from the stem. The continuous opening may overlap with the antenna.

A first branch and a second branch of the multiple branches of the continuous opening may form a branch pair that aligns with a loop of the antenna.

The multiple branches may form at least one discontinuous ring shape.

The multiple branches may define a discontinuous annular region of shielding material.

The continuous opening may have the characteristic of minimizing the formation of eddy currents in the shielding material when the antenna is activated.

The continuous opening may have the characteristic of increasing the signal-to-noise ratio of the antenna.

The capacitance module may include a third substrate where the third substrate may be aligned with the second substrate, the antenna and processing resources may be disposed on the third substrate, and the processing resources may be connected to the capacitance electrode on the first substrate.

The stem of the continuous opening may be in communication with an edge of the shielding material.

The stem may extend into a central region of the shield material defined by least one branch of the multiple branches of the continuous opening where the stem and at least one branch form a discontinuous annular region of the shield material.

The multiple branches of the continuous opening may form multiple discontinuous annular regions where at least two of the multiple discontinuous annular regions are electrically connected to each other with a shielding bridge.

The multiple discontinuous annular regions may be electrically connected to the rest of the shielding material that may be disposed on the second substrate.

A capacitance module may include a capacitance electrode on a first substrate; shielding material may be disposed on a second substrate where the second substrate may be aligned with the first substrate; and a continuous opening defined in the shielding material. The continuous opening may include a branching shape where the branching shape has a stem and multiple branches extending from the stem.

A first branch and a second branch of the multiple branches of the continuous opening may form a branch pair that aligns with a loop of the antenna.

The multiple branches may form at least one discontinuous ring shape.

The multiple branches may define a discontinuous annular region of shielding material.

The stem of the continuous opening may be in communication with an edge of the shielding material.

The stem may extend into a central region of the shield material defined by least one branch of the multiple branches of the continuous opening where the stem and at least one branch form a discontinuous annular region of the shield material.

The multiple branches of the continuous opening may form multiple discontinuous annular regions where at least two of the multiple discontinuous annular regions may be electrically connected to each other with a shielding bridge.

The multiple discontinuous annular regions may be electrically connected to the rest of the shielding material disclosed on the second substrate.

A portable electronic device may include shielding material disposed on a second substrate where the second substrate may be aligned with the first substrate; an antenna where the shielding material is between the antenna and the capacitance electrode; and a continuous opening defined in the shielding material. The continuous opening may include a branching shape, the branching shape may include a stem and multiple branches extending from the stem, and at least one branch of the multiple branches may be partially aligned with a loop of the antenna.

Figure 1:
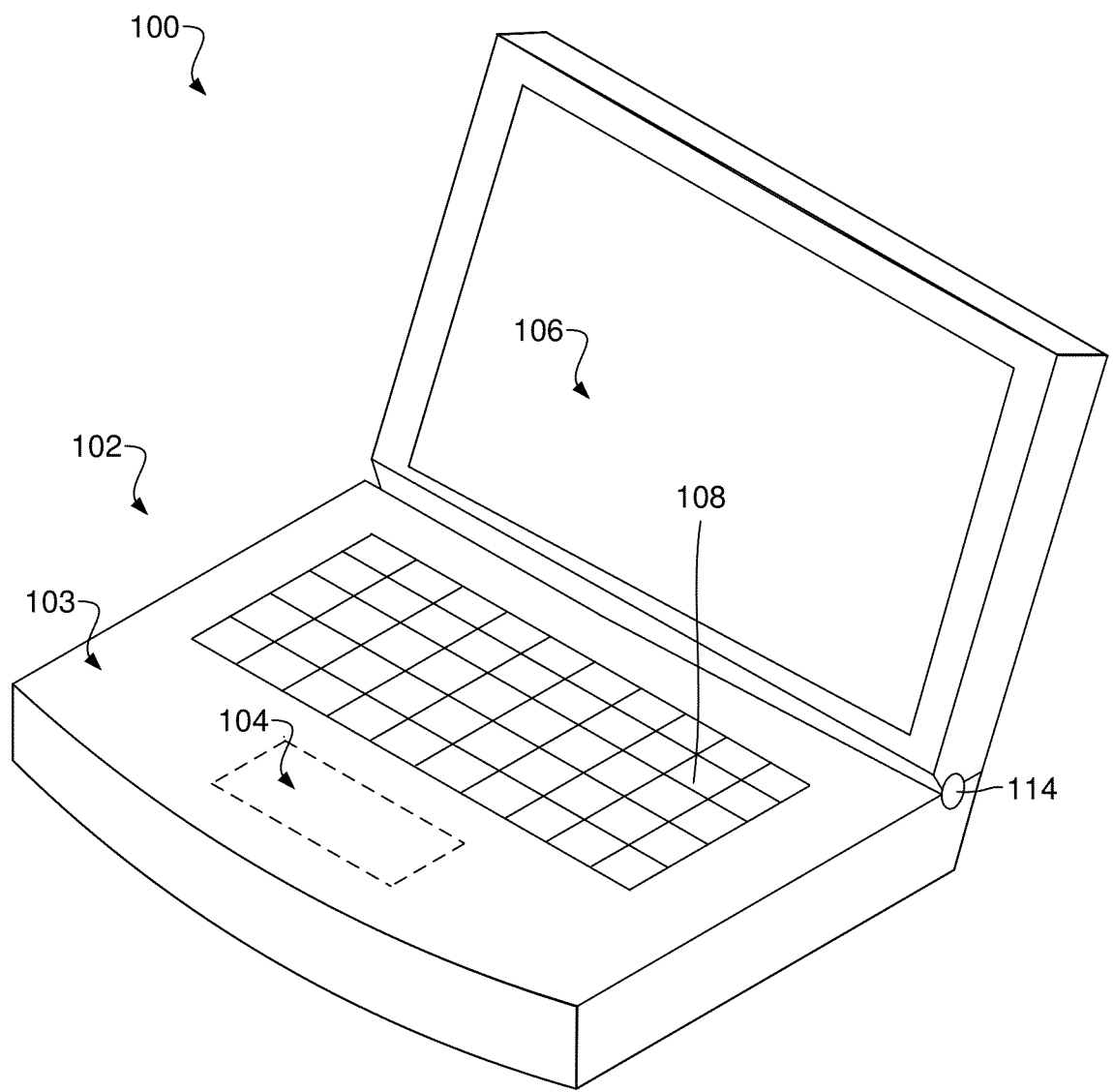
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positioned at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
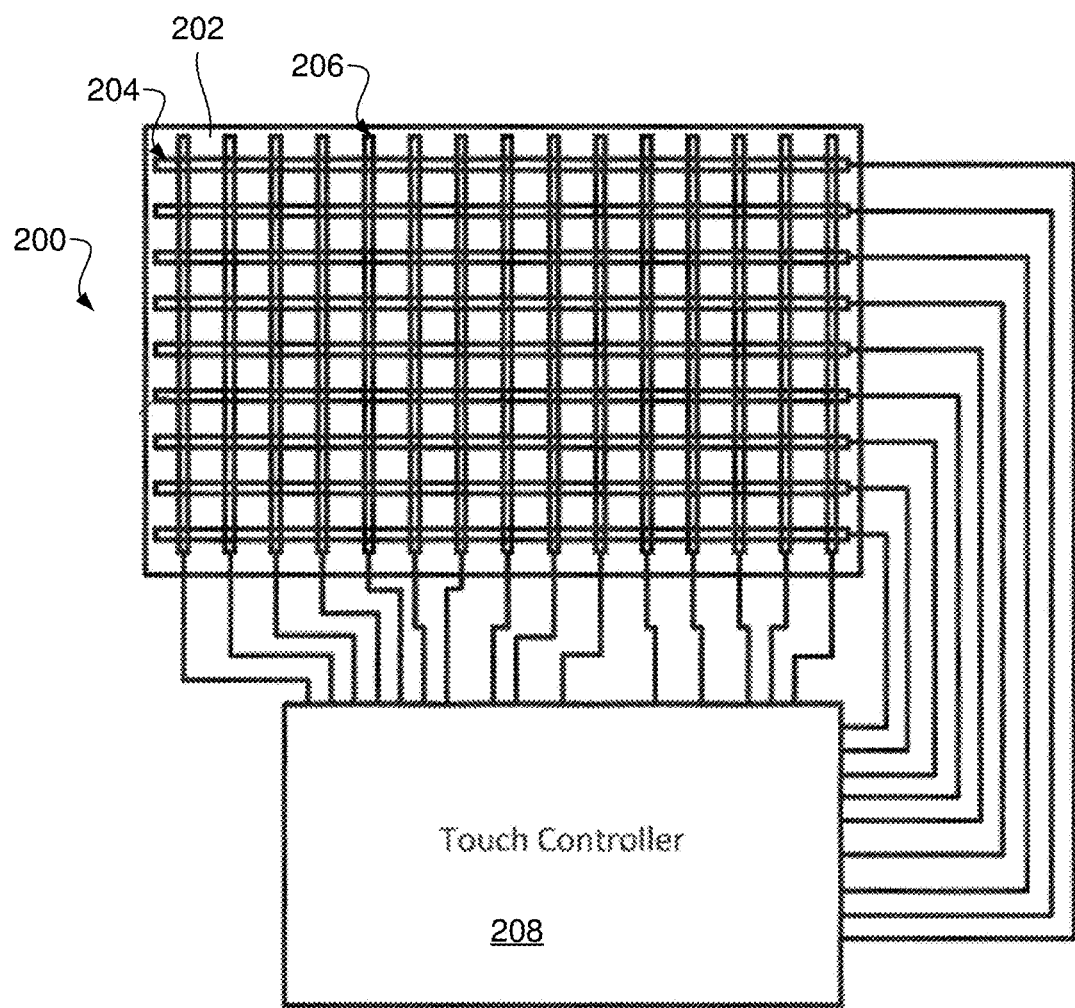
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
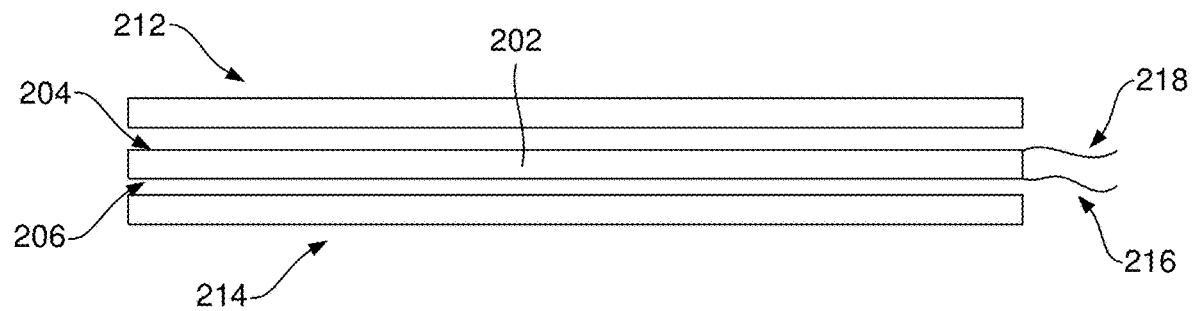
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
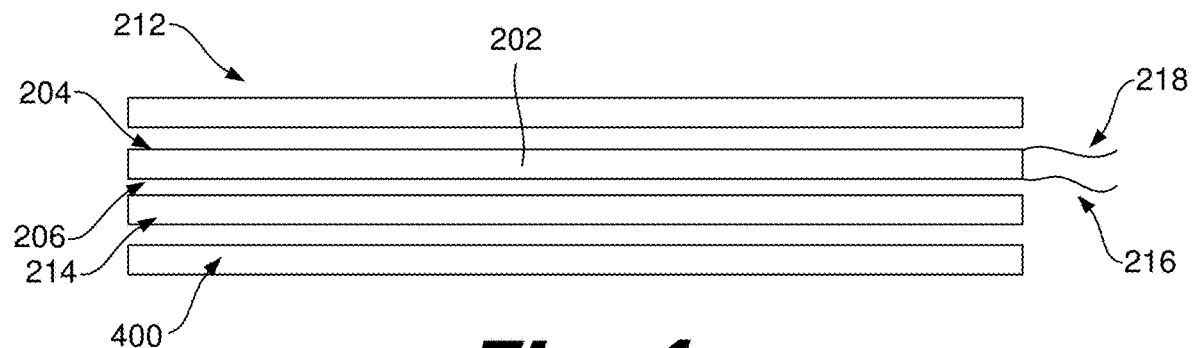
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
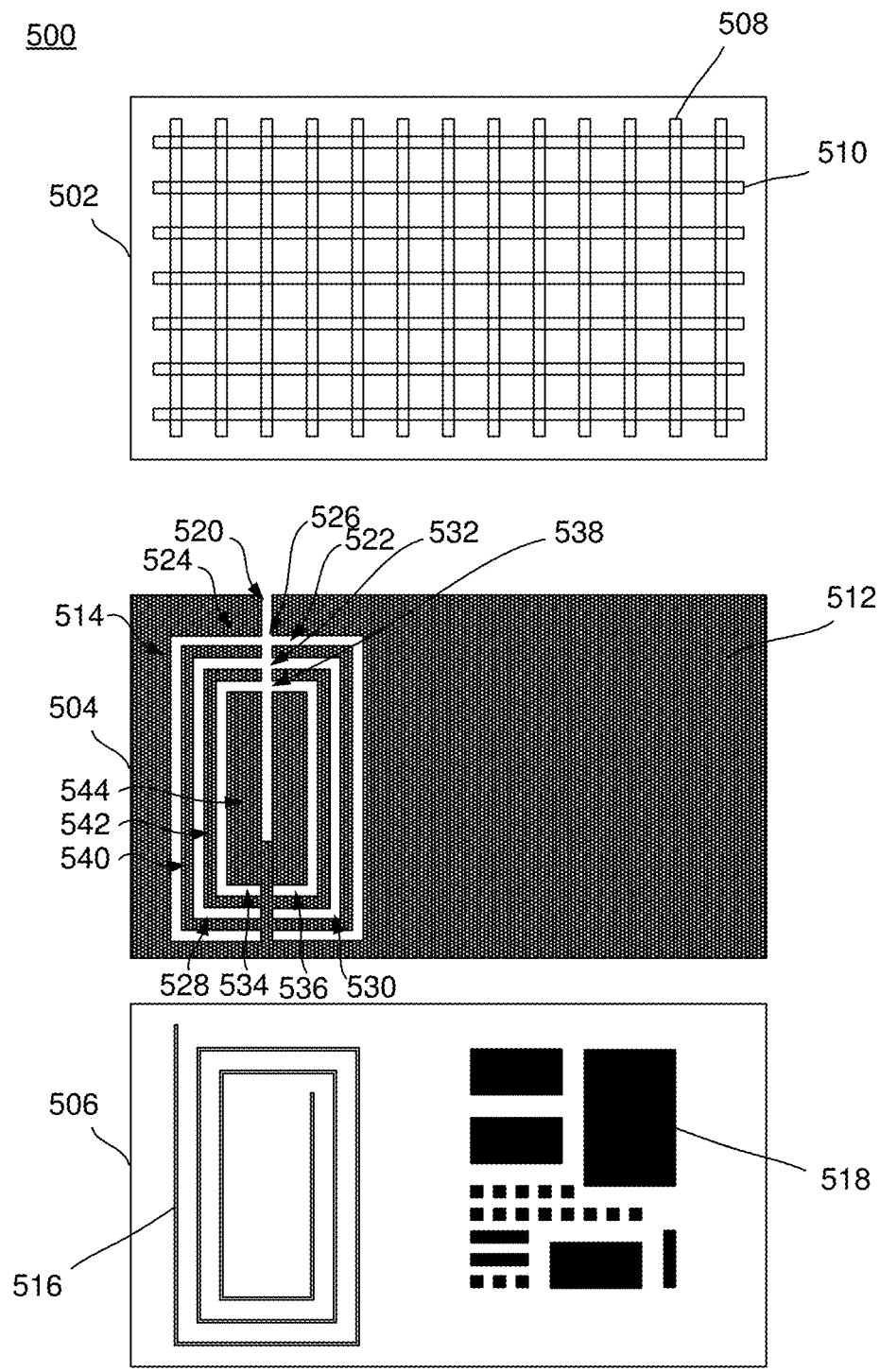
FIG. 5 depicts an example of a capacitance module in accordance with the disclosure.

FIG. 5 depicts an example of a capacitance module 500. In this example, the capacitance module 500 is a stack of three layers, including a sensor layer 502, a shield layer 504, and a component layer 506. While the capacitance module 500 in this example includes three layers, in other examples, a capacitance module may include a different number of layers. For example, a capacitance module may include four layers, five layers, or a different number of layers.

The sensor layer 502 may include a first set 508 of electrodes and a second set 510 of electrodes which may be used in a capacitance circuit to detect and/or measure changes in capacitance. While this example depicts a sensor layer 502 with two sets of electrodes, in other examples, a sensor layer may include one set of electrodes, three sets of electrodes, or a different number of sets of electrodes. While this example depicts a single sensor layer 502, in other examples a capacitance module may include more than one sensor layer.

The first set 508 of electrodes and the second set 510 of electrodes may operate using mutual capacitance, self-capacitance, or combinations thereof. In examples where a sensor layer includes a single set of electrodes, the single set of electrodes may operate using self-capacitance.

The shield layer 504 is located adjacent to the sensor layer 502 within the capacitance module 500. In other examples, a shield layer may be in another location relative other layers in a stack.

The shield layer 504 may be made of shielding material 512 which blocks or reduces electromagnetic and/or electrical interference. In some examples, shielding material may be a conductive material such as copper, aluminum, silver, or combinations thereof. In other examples, shielding material may be a composite material such as plastic, glass, another composite structure, or combinations thereof. In yet other examples, a shield layer may be a shielding material coating applied to a substrate, such as indium tin oxide (ITO), graphene, a conductive polymer, another coating, or combinations thereof. In some cases, shielding material may be a magnetic material, such as iron, ferrite, another metal, composites thereof, alloys thereof, mixtures thereof, or combinations thereof.

In this example, the shield layer 504 is implemented with a single shielding material 512. In other examples, a shield layer may be implemented differently. Different implementations of shield layers may offer specific advantages. For example, a shield layer may be implemented as a hatched shield, where a grid or mesh pattern of conductive material is used. Such an implementation may reduce the weight and cost of a shield layer while still providing adequate shielding. In another example, a shield layer may be implemented in segments, where sections of conductive material are interspersed with non-conductive gaps. Such an implementation may allow for flexibility in the construction and layout of the capacitance module, potentially improving thermal management and accommodating complex component configurations within the electronic device.

In this example, the shield layer 504 is located between the sensor layer 502 and the component layer 506. The shield layer 504 may help prevent electromagnetic interference originating from components 518 on the component layer 506 or sources external to the capacitance module from interfering with the first set 508 and/or second set 510 of electrodes on the sensor layer 502.

Shielding the sensor layer 502 with the shield layer 504 may improve the accuracy and stability of capacitance measurements measured by first set 508 and second set 501 of electrodes. Shielding the sensor layer 502 may also reduce noise, which may increase the sensitivity and accuracy of user inputs on the capacitance module 500. The shield layer 504 may be positioned to block interference from a battery, power sources, memory resources, processing resources, electronic components, other components, or combinations thereof that may be positioned within a cavity of the electronic device.

In this example, the component layer 506 is adjacent to the shield layer 504. In other examples, a component layer may be in another location relative to other layers in a. stack or parts of a capacitance module. The component layer 506 includes an antenna 516 and other components 518.

Components 518 included on the component layer 506 may facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

The antenna 516 may facilitate wireless communication according to a near field communication (NFC) protocol, a Wi-Fi protocol, a short-range wireless protocol, another wireless protocol, or combinations thereof.

In this example, the component layer 506 includes an antenna 516. In other examples, a layer in a capacitance module may include more than one antenna.

The antenna 516 may be constructed from a highly conductive material to maximize efficiency in signal transmission and reception. In some examples, an antenna may be made of copper, silver, gold, another conductive material, composites thereof, mixtures thereof, alloys thereof, or combinations thereof.

In some examples, the antenna 516 may be deposited on the component layer 506. In other examples, the antenna 516 may be etched into the component layer 506 via a photolithographic process or the like.

An antenna may have a coil shape, dipole shape, another type of shape, or combinations thereof. The shape of an antenna may correspond to the wireless protocol the antenna is configured to transmit and the radiation pattern of the antenna. In this example, the antenna 516 has a coil shape, which may be used to transmit a wireless signal according to the NFC protocol.

The shield layer 504 may include a continuous opening 514. The continuous opening 514 may be a series of interconnected openings defined in the shield layer 504. The continuous opening 514 may be constructed to allow electromagnetic radiation from the antenna 516 to pass through the shield layer 504 with minimal attenuation while the shield layer blocks radiation originating from the components 518 on the component layer, batteries near the component layer, or other sources of electromagnetic radiation. The example depicted in FIG. 5 may permit transmission of wireless signals from the antenna through the shielding material and through the capacitance sensor layer(s) while blocking interference from the noise generated by other electromagnetic sources.

In this example, the continuous opening 514 extends through a first surface of the shield layer to a second surface of the shield layer 504, which is opposite the first surface. The continuous opening includes a stem 520 connected to multiple branches. A first branch 522 and a second branch 524 form a first branch pair 526 of the continuous opening 514. The first branch pair 526 forms a first discontinuous ring. A third branch 528 and a fourth branch 530 for a second branch pair 532 of the continuous opening 514. The second branch pair 532 forms a second discontinuous ring. The continuous opening 514 also includes a fifth branch 534 and a sixth branch 536, which form a third branch pair 538. The first branch pair 526, the second branch pair 532, and the third branch pair 538 intersect with the stem at different locations. In this example, the first branch pair surrounds the second branch pair and is only connected to the second branch pair through the stem. Further in this example, the second branch pair surrounds the third branch pair and is only connected to the third branch pair through the stem.

The first branch pair 526 and the second branch pair 532 define a first discontinuous annular region 540 of shielding material. The second branch pair 532 and the third branch pair 538 define a second discontinuous annular region 542 of shielding material. The third branch pair 538 and the stem 520 define a third discontinuous annular region 544. In this example, the stem extends into a central region of the shield material and partly bifurcates the central regions to form the third discontinuous annular region 544. Each of the first, second, and third discontinuous annular regions 540, 542, 544 are electrically connected to one another and to the rest of the shielding material. In the example depicted in FIG. 5 each of the first, second, and third discontinuous annular regions 540, 542, 544 are electrically connected with a first shielding bridge 550, a second shielding bridge 552, and a third shielding bridge 554.

In the example depicted in FIG. 5, the shieling bridges 550, 552, 554 are aligned with each other forming a row. In other examples with shielding bridges, the shielding bridges may be misaligned and/or offset from each other.

The continuous opening 514 may be manufactured onto the shield layer 504 through various techniques. In some examples, the continuous opening 514 may be laser cut into the substrate of the shield layer 504, enabling complex continuous opening shapes. In other examples, the continuous opening 514 may be etched into the shield layer 504 via a photolithographic process, a chemical etching process, another etching process, or combinations thereof. In other examples. The continuous opening 514 may be mechanically milled or drilled into the substrate of the shield layer 504. In yet other examples, the continuous opening 514 may be stamped or punched into the substrate of the shield layer 504.

The shape of the continuous opening 514 may be configured to ensure that the shielding material 512 of the shield layer 504 shares a common electrical ground. For example, each of the discontinuous annular regions may share a common electrical ground. Sharing a common electrical ground throughout the entire shield layer 504 may offer some advantages. Using a single, common ground may simplify the construction and layout of a shield layer. A single grounding point may eliminate the possibility of ground noise between multiple ground points to facilitate a uniform potential across the shield.

The branching shape of the continuous opening 514 may reduce the formation of eddy currents on the shield layer 504. The branching pattern of the continuous opening 514 may break up the shield layer 504 into smaller regions. This segmentation may disrupt the paths that would otherwise allow eddy currents to circulate freely on the shield layer 504. The branching shape may also create interruptions and irregular paths in the shielding material 512, preventing the formation of large, closed loops that may be conducive to eddy current formation. In some examples, the branching shape of the continuous opening may create a non-uniform distribution of magnetic flux. This non-uniformity may reduce the likelihood of large eddy currents forming, as magnetic field lines are more dispersed and less likely to induce strong currents.

In some examples, a discontinuous annular shape may disrupt the formation of an eddy current. In examples where an antenna loop is adjacent to a solid, uninterrupted shielding material, an eddy current may naturally form in such a way that the eddy current has a size that is similar to the size of the antenna loop and the eddy current's flow of electrons mimic an electron flow path of the electrons traveling along the antenna loop. While not being bound by any particular theory, it is believed that an eddy current formed in a discontinuous annular region adjacent to an antenna loop may be minimized or weakened, in part at least, because the discontinuity may disrupt a flow of electrons that would otherwise flow around a continuous annular region. Thus, the principles of the present disclosure may provide an opening in the shielding material to allow the transmission of an antenna signal to pass through the shielding material and also past the capacitance sensor while also blocking other electromagnetic transmissions from other sources through the shielding material and also minimizing or preventing antenna induced eddy currents in the shielding material.

The branching shape of the continuous opening 514 may increase the signal-to-noise ratio (SNR) of a wireless signal transmitted through the shield layer 504 by the antenna 516. The branching shape of the continuous opening 514 may allow specific frequencies of a desired signal to pass through the aperture while blocking or attenuating unwanted frequencies and electromagnetic noise that may originate from components 518 on the component layer. Thus, the branching shape may facilitate antenna signal filtering. This selectivity may enhance the transmission of the desired signals relative to noise. The complex shape of the continuous opening 514 may also help reduce unwanted signal reflections that may occur at the edges of apertures with other shapes. The reduction in eddy currents offered by the shape of the continuous opening 514 may also reduce the electromagnetic interference generated by these eddy currents.

While the continuous opening 514 depicted in this example has a shape with three branches pairs, in other examples, a continuous opening may have a different shape. In some examples, a continuous opening may have a different number of branch pairs, such as two branching pairs, one branching pair, four branching pairs, another number of branch pairs, or combinations thereof. In other examples, the shape of a continuous opening may be determined, in part, by the shape of the antenna configured to transmit a wireless signal through a shield layer. These shapes of continuous opening may include spiral shapes, dipole shapes, another type of shape, or combinations thereof. In some examples, the shape of the continuous opening may be asymmetric.

Further, in some examples, a first branch and a second branch of a branch pair may not intersect the stem at the same location. In other examples, a first branch and a second branch of a branch pair may intersect the stem at the same location. In some examples, at least one of the branches is transversely oriented with the stem. In some examples, the branch may include at least one bend or a curve that assists in defining the discontinuous annular regions.

At least one branch pair may align with at least one loop of the antenna; overlap with at least one loop of the antenna; track at least one loop of the antenna; and/or be superjacent, adjacent, or subjacent with a least one loop of the antenna. In some examples, at least one branch pair of the continuous opening may be offset with at least one loop of the antenna. In some examples, the width of the continuous opening is approximately the width of a loop of the antenna, within ten percent of the width of the loop antenna, within 25 percent of the width of the loop antenna, or combinations thereof. In some examples, the length of the continuous opening is approximately the length of a loop of the antenna, within ten percent of the width of the loop antenna, within 25 percent of the width of the loop antenna, or combinations thereof. In some examples, the thickness of the stem and/or at least one branch is approximately the thickness of a loop of the antenna, within ten percent of the thickness of the loop antenna, within 25 percent of the thickness of the loop antenna, or combinations thereof.

While the shield layer 504 in this example includes a single continuous opening 514, in other examples, a shield layer may include more than one continuous opening. For example, a shield layer may include two continuous openings, three continuous openings, another number of continuous openings, or combinations thereof. In some embodiments, the number of continuous openings on a shield layer may correspond to the number of antennas on an adjacent layer within the capacitance module. However, in other examples, multiple continuous openings may be in conjunction with a single antenna. For example, multiple continuous openings may overlap with a single antenna.

Figure 6:
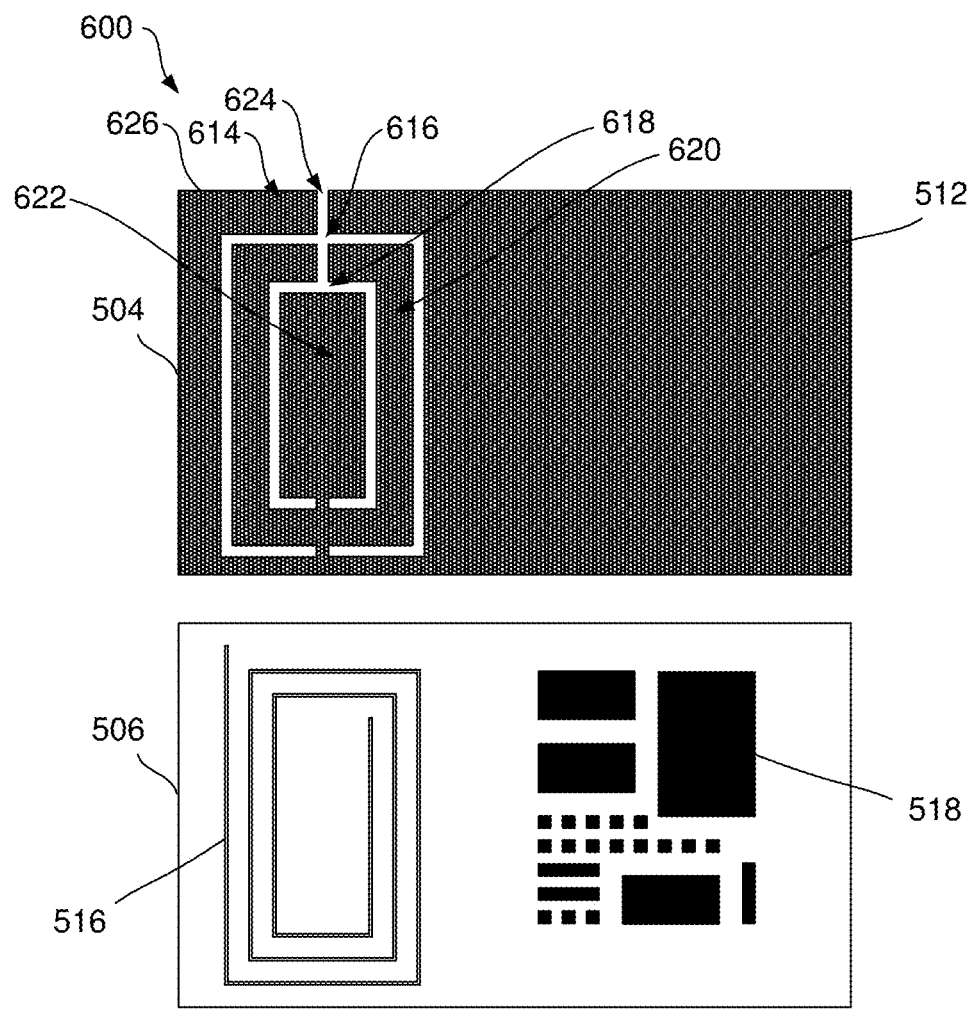
FIG. 6 depicts an example of a capacitance module in accordance with the disclosure.

FIG. 6 depicts an example of a capacitance module 600 in accordance with the disclosure. In this example, the shield layer 504 includes a continuous opening 614 with two branch pair, a first branch pair 616 and a second branch pair 618. Having fewer branch pairs may result in having smaller internal regions of the shielding material formed with the branch pairs. In this case, an outer annular region 620 is formed by the first and second branch pairs 616 and 618, and a central region 622 is formed just with the second branch pair 618.

In this example the stem 624 is in communication with both the first branch pair 616 and the second branch pair 618. Also in this example, the stem 624 is in communication with an edge 626 of the shielding material 512. Also, in this illustrated example, the stem 624 does not protrude into the central region.

Figure 7:
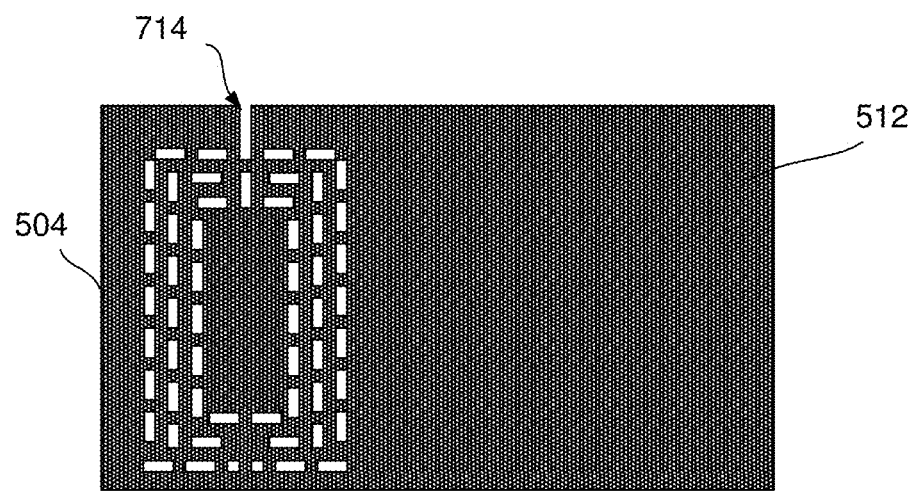
FIG. 7 depicts an example of a capacitance module in accordance with the disclosure.
Figure 7:
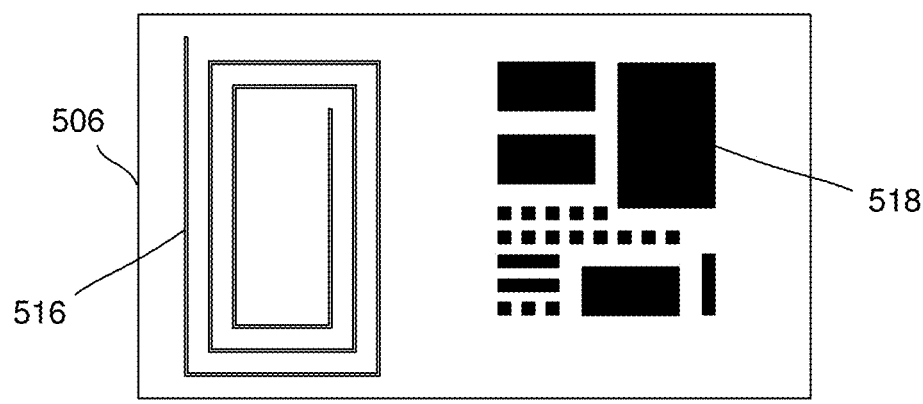

FIG. 7 depicts an example of a capacitance module 700 in accordance with the disclosure. In this example, the shield layer 504 includes a continuous opening 714 comprising many openings in the substrate of the shield layer. In some examples, a continuous opening may be multiple opening throughout the substrate of a shield layer. In other examples, such as the example depicted in FIG. 7, a continuous opening may include many such openings which are discontinuous from one another.

Figure 8:
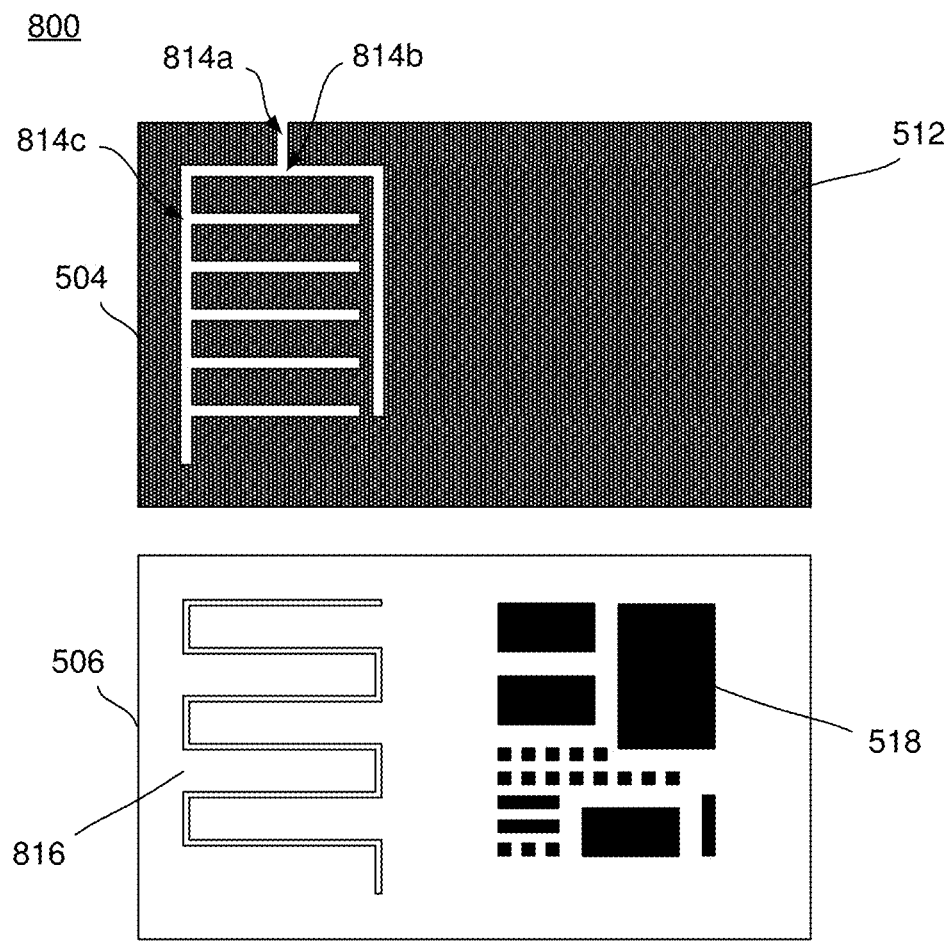
FIG. 8 depicts an example of a capacitance module in accordance with the disclosure.

FIG. 8 depicts an example of a capacitance module 800 in accordance with the disclosure. In this example, the component layer 506 includes an antenna 816 with a shape which may be suitable for transmitting a wireless signal according to a Wi-Fi protocol. The shield layer 504 includes a continuous opening 814a. The continuous opening 814a has a first branch 814b and a second branch 814c. The shape of the continuous opening 814a may correspond to the shape of the antenna 816 on the component layer 506.

In this depicted example, multiple sub-branches 820 extend from first branch 814b. In this example, the sub-branches protrude inward to a space that is collectively defined by the first branch 814b and the second branch 814c. However, in some examples, the sub-branches may extend from the second branch 814c. In alternative embodiments, a subset of sub-branches may extend from the first branch while another subset of the sub-branches may extend from the second branch.

Figure 9:
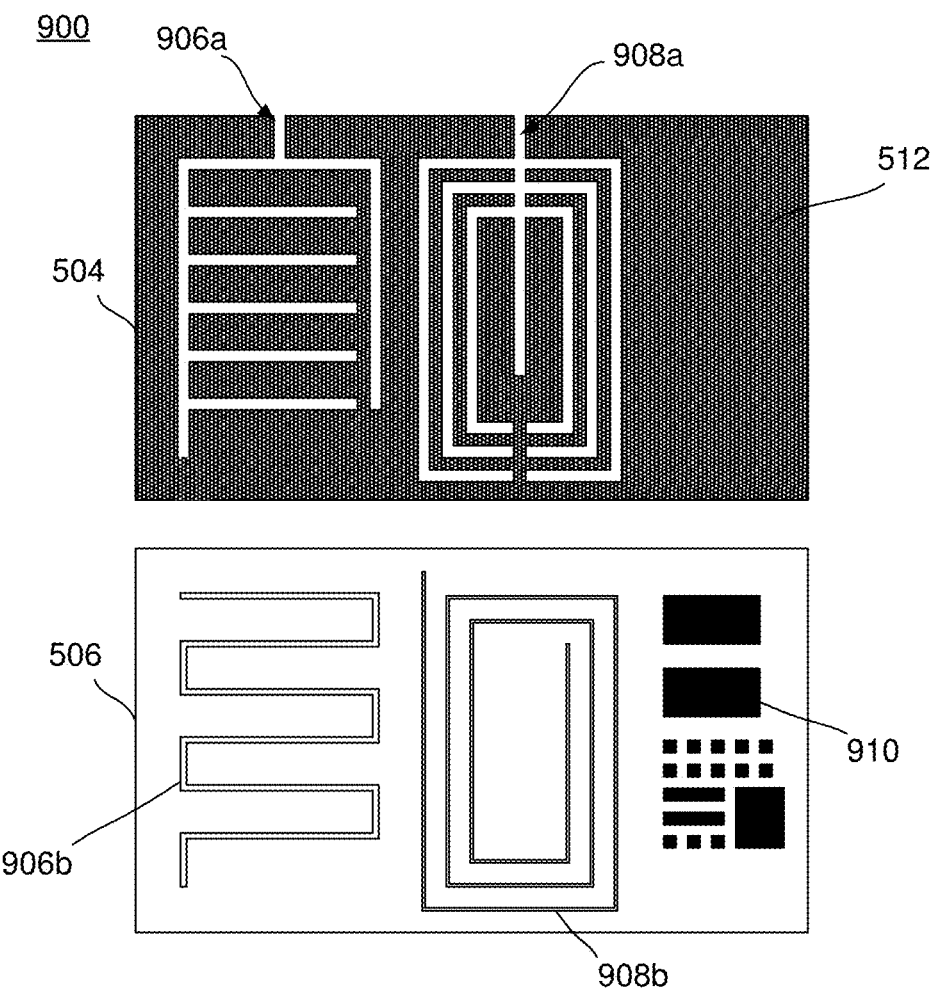
FIG. 9 depicts an example of a capacitance module in accordance with the disclosure.

FIG. 9 depicts an example of a capacitance module 900 in accordance with the disclosure. The component layer 506 includes a first antenna 906b and a second antenna 908b. The shield layer 504 includes a first continuous opening 906a and a second continuous opening 908a. The shape and position of the first continuous opening 906a on the shield layer 504 may correspond to the shape and position of the first antenna 906b on the component layer 506. Likewise, the shape and position of the second continuous opening 908a on the shield layer 504 may correspond to the shape and position of the second antenna 908b on the component layer 506.

Figure 10:
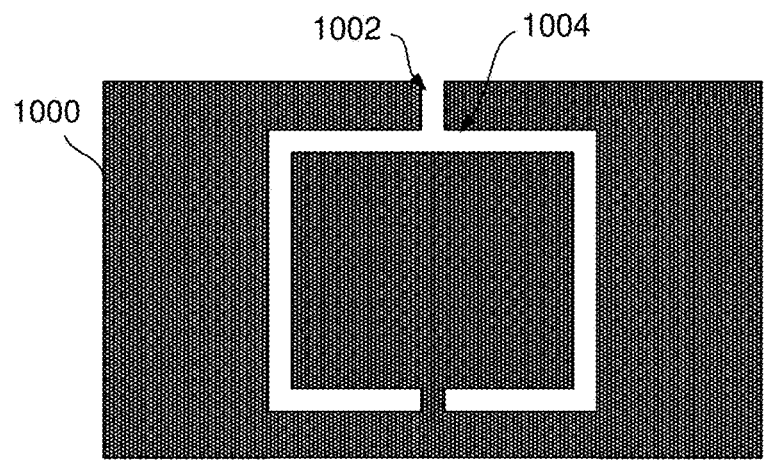
FIG. 10 depicts an example of a shield layer in accordance with the disclosure.

FIG. 10 depicts an example of a shield layer 1000 with a continuous opening 1002 with one branch pair 1004. The shape of the continuous opening 1002 may offer reduced manufacturing complexity and greater shielding from component interference.

Figure 11:
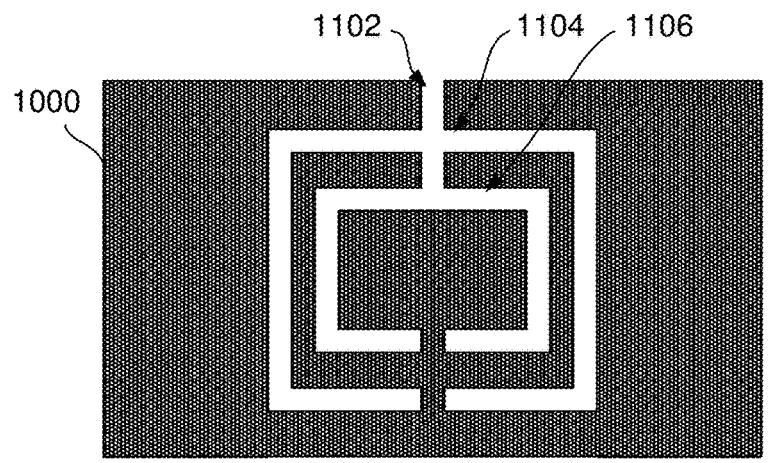
FIG. 11 depicts an example of a shield layer in accordance with the disclosure.

FIG. 11 depicts an example of the shield layer 1000 with a continuous opening 1102. The continuous opening 1102 includes a first branch pair 1104 and a second branch pair 1106.

Figure 12:
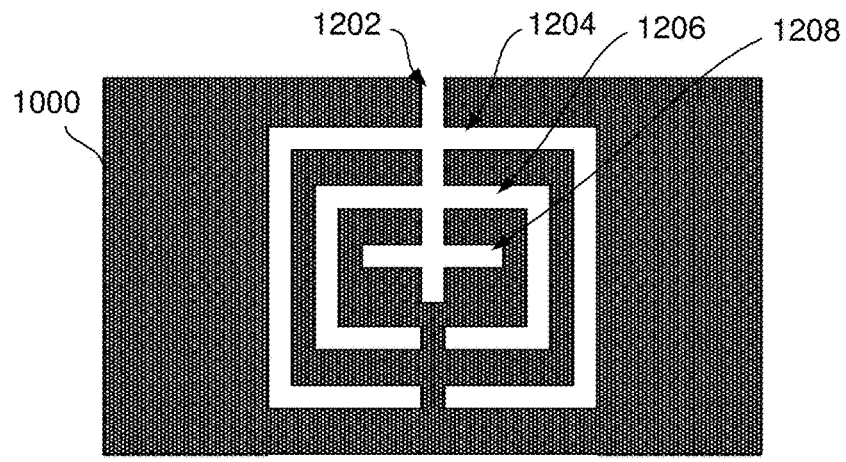
FIG. 12 depicts an example of a shield layer in accordance with the disclosure.

FIG. 12 depicts an example of the shield layer 1000 with a continuous opening 1202. The continuous opening 1202 includes a first branch pair 1204, a second branch pair 1206, and a third branch pair 1208. The shape of the continuous opening 1202 may offer reduced eddy current formation and propagation.

Figure 13:
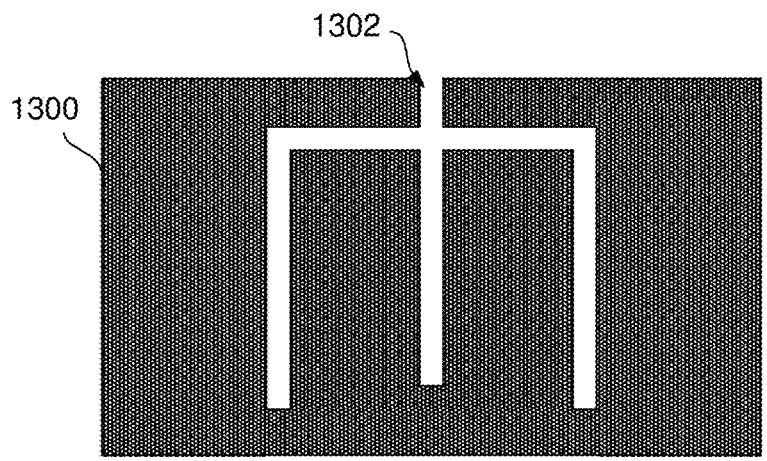
FIG. 13 depicts an example of a shield layer in accordance with the disclosure.

In some examples, a continuous opening may have a pronged shape. FIG. 13 depicts an example a shield layer 1300 with a continuous opening 1302. The continuous opening 1302 has a three-pronged shape. In other examples, a continuous opening with a pronged shape may have a different number of prongs. The shape of the continuous opening 1302 may correspond to the shape of the antenna configured to transmit a wireless signal through the shield layer 1300.

Figure 14:
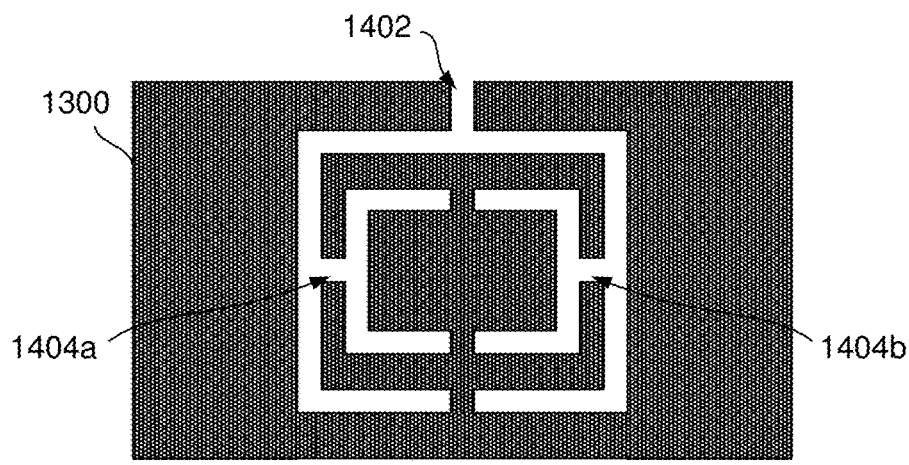
FIG. 14 depicts an example of a shield layer in accordance with the disclosure.

FIG. 14 depicts an example of the shield layer 1300 with a t continuous opening 1402. The continuous opening 1402 has a first branched region 1404a and a second branched region 1404b. The shape of the continuous opening 1402 may correspond to the shape of the antenna configured to transmit a wireless signal through the shield layer 1300.

Figure 15:
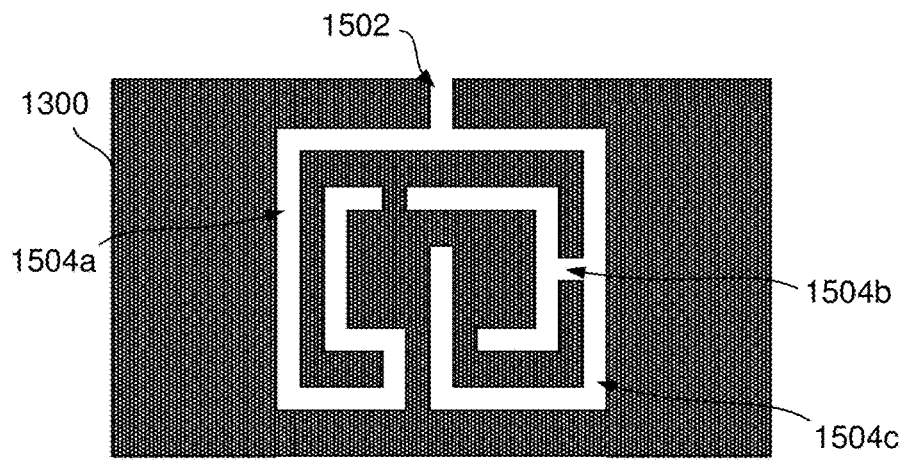
FIG. 15 depicts an example of a shield layer in accordance with the disclosure.

FIG. 15 depicts an example of the shield layer 1300 with a continuous opening 1502. The continuous opening 1502 includes a first branch 1504a, a second branch 1504b, and a third branch 1504c. The shape of the continuous opening 1502 may correspond to the shape of the antenna configured to transmit a wireless signal through the shield layer 1300.

Figure 16A:
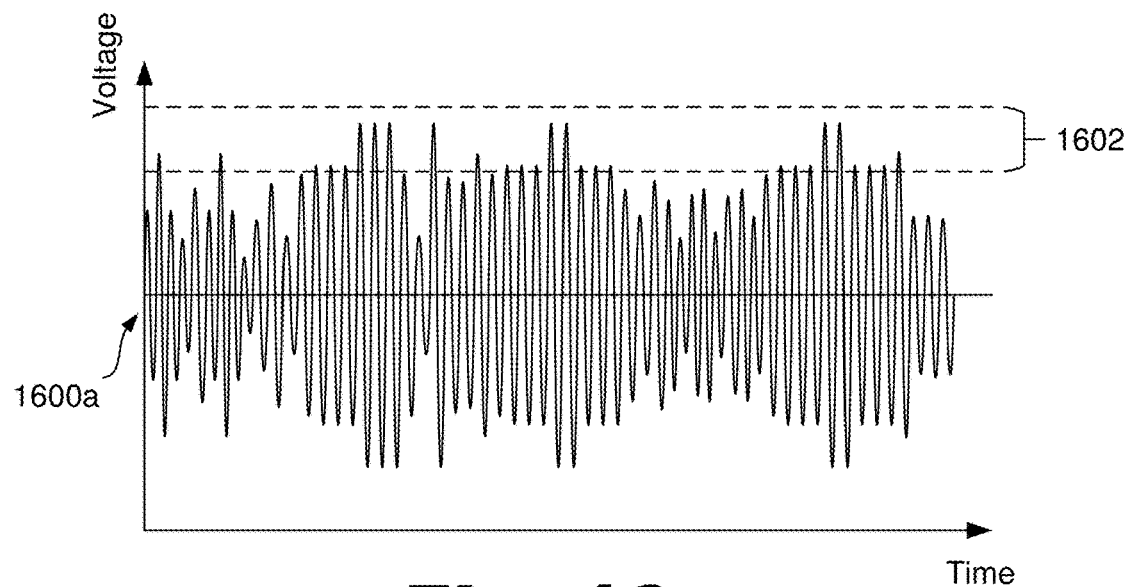
FIG. 16a depicts an example of a voltage graph in accordance with the disclosure.

FIG. 16a depicts an example of a voltage graph. Voltage is represented on the vertical axis and time is represented on the horizontal axis. A first signal 1600a is represented as a time-voltage signal on the voltage graph. The first signal 1600a may correspond to a wireless signal propagating through a shield layer in a capacitance module.

A first difference 1602 represents the difference between the voltage peak of the signal 1600a and the noise floor of the signal. The greater difference between a voltage peak and noise floor of a signal, the greater the transmission efficiency of the signal.

Figure 16B:
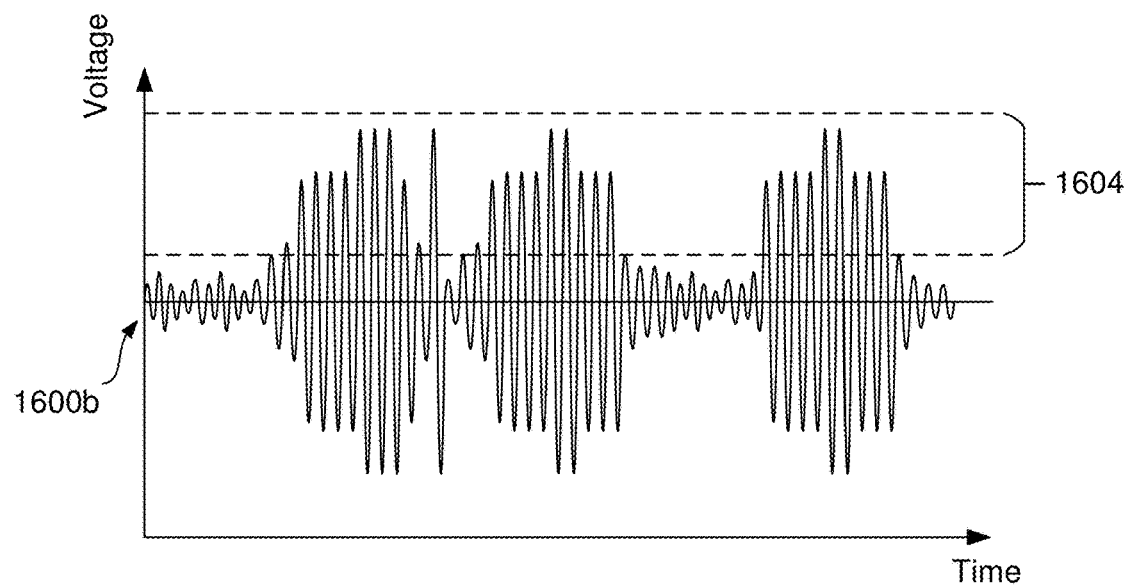
FIG. 16b depicts an example of a voltage graph in accordance with the disclosure.

FIG. 16b depicts an example of a voltage graph with voltage represented on the vertical axis and time represented on the horizontal axis. A second signal 1600b is represented as a time-voltage signal on the voltage graph. The second signal 1600b may correspond to a wireless signal propagating through a continuous opening in a shield layer in a capacitance module. A second difference 1604 represents the difference between the voltage peak of the signal 1600b and the noise floor of the signal.

Figure 16C:
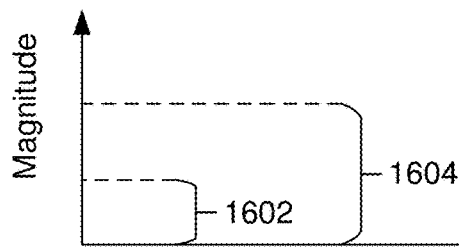
FIG. 16c depicts an example of magnitudes in accordance with the disclosure.

FIG. 16c depicts the magnitudes of the first difference 1602 and the second difference 1604. The magnitude of the second difference 1604 may be greater than the magnitude of the first difference 1602. The greater magnitude of the second difference 1604 may correspond to the inclusion of a continuous opening in the shield layer. Including a continuous opening in a shield layer may increase the signal-to-noise ratio of a wireless signal transmitted through a shield layer.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
   a capacitance electrode on a first substrate;
   shielding material disposed on a second substrate where the second substrate is aligned with the first substrate;
   an antenna;
   wherein the shielding material is between the antenna and the capacitance electrode; and
   a continuous opening defined in the shielding material;
   wherein the continuous opening includes a branching shape, the branching shape comprising a stem and multiple branches extending from the stem;
   wherein the continuous opening overlaps with the antenna;
   wherein the multiple branches of the continuous opening form multiple discontinuous annular regions;
   wherein at least two of the multiple discontinuous annular regions are electrically connected to each other with a shielding bridge.

2. The capacitance module of claim 1, wherein a first branch and a second branch of the multiple branches of the continuous opening forms a branch pair that aligns with a loop of the antenna.

3. The capacitance module of claim 1, wherein the multiple branches form at least one discontinuous ring shape.

4. The capacitance module of claim 1, wherein the multiple branches define a discontinuous annular region of shielding material.

5. The capacitance module of claim 1, wherein the continuous opening has the characteristic of minimizing the formation of eddy currents in the shielding material when the antenna is activated.

6. The capacitance module of claim 1, wherein the continuous opening has the characteristic of increasing the signal-to-noise ratio of the antenna.

7. The capacitance module of claim 1, further comprising a third substrate where the third substrate is aligned with the second substrate;
   the antenna and processing resources are disposed on the third substrate;
   the processing resources are connected to the capacitance electrode on the first substrate.

8. The capacitance module of claim 1, wherein the stem of the continuous opening is in communication with an edge of the shielding material.

9. The capacitance module of claim 1, wherein the stem extends into a central region of the shield material defined by least one branch of the multiple branches of the continuous opening;
   wherein the stem and the at least one branch form a discontinuous annular region of the shield material.

10. The capacitance module of claim 1, wherein the multiple discontinuous annular regions are electrically connected to the rest of the shielding material that is disposed on the second substrate.

11. A capacitance module, comprising:
    a capacitance electrode on a first substrate;
    shielding material disposed on a second substrate where the second substrate is aligned with the first substrate; and
    a continuous opening defined in the shielding material;
    wherein the continuous opening includes a branching shape, the branching shape comprising a stem and multiple branches extending from the stem;
    wherein the multiple branches of the continuous opening form multiple discontinuous annular regions;
    wherein at least two of the multiple discontinuous annular regions are electrically connected to each other with a shielding bridge.

12. The capacitance module of claim 11, wherein a first branch and a second branch of the multiple branches of the continuous opening forms a branch pair that aligns with a loop of the antenna.

13. The capacitance module of claim 11, wherein the multiple branches form at least one discontinuous ring shape.

14. The capacitance module of claim 11, wherein the multiple branches define a discontinuous annular region of shielding material.

15. The capacitance module of claim 11, wherein the stem of the continuous opening is in communication with an edge of the shielding material.

16. The capacitance module of claim 11, wherein the stem extends into a central region of the shield material defined by least one branch of the multiple branches of the continuous opening;
    wherein the stem and the at least one branch form a discontinuous annular region of the shield material.

17. The capacitance module of claim 11, wherein the multiple discontinuous annular regions are electrically connected to the rest of the shielding material that is disclosed on the second substrate.

18. A portable electronic device, comprising:
    shielding material disposed on a second substrate where the second substrate is aligned with the first substrate;
    an antenna;
    wherein the shielding material is between the antenna and the capacitance electrode; and
    a continuous opening defined in the shielding material;
    wherein the continuous opening includes a branching shape, the branching shape comprising a stem and multiple branches extending from the stem;
    wherein at least one branch of the multiple branches is partially aligned with a loop of the antenna;
    wherein the multiple branches of the continuous opening form multiple discontinuous annular regions;
    wherein at least two of the multiple discontinuous annular regions are electrically connected to each other with a shielding bridge.

* * * * *